United States Patent
Garcia et al.

(10) Patent No.: US 7,958,563 B2
(45) Date of Patent: Jun. 7, 2011

(54) METHOD FOR USING AN ATOMIC FORCE MICROSCOPE

(75) Inventors: Ricardo Garcia Garcia, Tres Cantos (ES); Jose Luis Rodriguez Lozano, Tres Cantos (ES); Nicolas F. Martinez Caudrado, Tres Cantos (ES); Shivaprasad Vitthal Patil, Tres Cantos (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 98 days.

(21) Appl. No.: 12/374,438

(22) PCT Filed: Jul. 4, 2006

(86) PCT No.: PCT/ES2006/070096
§ 371 (c)(1),
(2), (4) Date: Sep. 18, 2009

(87) PCT Pub. No.: WO2008/003796
PCT Pub. Date: Jan. 10, 2008

(65) Prior Publication Data
US 2010/0017924 A1    Jan. 21, 2010

(51) Int. Cl.
*G21B 21/08*        (2006.01)
(52) U.S. Cl. .......... 850/5; 850/1; 850/33; 250/306; 250/307
(58) Field of Classification Search .......... 850/1, 5, 850/33; 250/306, 307
See application file for complete search history.

(56) References Cited

U.S. PATENT DOCUMENTS

| 7,498,060 B2 * | 3/2009 | Biscarini et al. ........... 427/255.6 |
| 7,569,817 B2 * | 8/2009 | Kusaka et al. ................ 250/306 |
| 7,605,368 B2 * | 10/2009 | Shigeno et al. .............. 250/306 |
| 7,659,509 B2 * | 2/2010 | Workman et al. ............. 250/310 |
| 7,683,318 B2 * | 3/2010 | Bunton et al. ................ 250/309 |
| 7,690,047 B2 * | 3/2010 | Yasuda et al. ................... 850/54 |

(Continued)

FOREIGN PATENT DOCUMENTS

WO    2007036591 A1    4/2007

OTHER PUBLICATIONS

Lin et al., "Analytical solutions of the first three frequency shifts of AFM non-uniform probe subjected to the Lennard-Jones force". Ultramicroscopy 106 (2006) 508-515, Elsevier B.V., Apr. 2006, the whole document.

(Continued)

*Primary Examiner* — David A Vanore
(74) *Attorney, Agent, or Firm* — Leason Ellis LLP

(57) ABSTRACT

The present invention relates to a method of using an atomic force microscope comprising exciting natural lower and higher vibration modes of a microlever (M) placed on a sample, and analyzing the variation of one variable of a first output signal ($A_i \cos(\omega_i t - \phi_i)$) representative of the response of M to the excitation of the lower mode, with respect to the variation of a parameter influenced by one variable of a second output signal ($A_j \cos(\omega_j t - \phi_j)$) representative of the response of M to the excitation of the higher mode, and/or analyzing the variation of one variable of a second output signal ($A_j \cos(\omega_j t - \phi_j)$) representative of the response of M to the excitation of the higher mode, with respect to the variation of a parameter influenced by one variable of a first output signal ($A_i \cos(\omega_i t - \phi_i)$) representative of the response of M to the excitation of the lower mode.

21 Claims, 4 Drawing Sheets

U.S. PATENT DOCUMENTS

| | | | |
|---|---|---|---|
| 7,765,606 B2 * | 7/2010 | Kusaka et al. | 850/54 |
| 7,770,231 B2 * | 8/2010 | Prater et al. | 850/6 |
| 7,784,107 B2 * | 8/2010 | Kley | 850/4 |
| 2003/0175945 A1 | 9/2003 | Thompson et al. | |
| 2004/0134265 A1 | 7/2004 | Mancevski | |
| 2005/0034512 A1 | 2/2005 | Su et al. | |
| 2006/0033024 A1 * | 2/2006 | Sparks et al. | 250/306 |
| 2006/0219900 A1 * | 10/2006 | Watanabe et al. | 250/306 |
| 2010/0107284 A1 * | 4/2010 | Shigeno et al. | 850/5 |
| 2010/0116985 A1 * | 5/2010 | Bunton et al. | 250/307 |

OTHER PUBLICATIONS

Rodriguez, Tomas et al. "Compositional mapping of surfaces in atomic force microscopy by excitation of the second normal mode of the microcantilever", Applied Physics Letters, vol. 84, No. 3, Jan. 19, 2004, p. 449.

Rodriguez, Tomas, et cl. "Tip motion in amplitude modulation (tapping-mode) atomic force microscopy: Comparison between continuous and point-mass models", Applied Physics Letters, vol. 80, No. 9, Mar. 4, 2002, p. 1646.

Bar, G. et al. "Effect of Viscoelastic Properties of Polymers on the Phase Shift in Tapping Mode Atomic Force Microscopy", Langmuir 1998, 14, pp. 7343-7347.

Tamayo, J. et al., "Effects of elastic and inelastic interactions on phase contrast images in tapping-mode scanning force microscopy", Applied Physics Letters, vol. 71, No. 16, Oct. 20, 1997, p. 2394.

Cleveland, J.P. et al., "Energy dissipation in tapping-mode atomic force microscopy", Applied Physics Letter, vol. 72, No. 20, May 18, 1998, p. 2613.

Fritz J. et al. "Translating Biomolecular Recognition into Nanomechanics", Science 288, 316 (2000);.

Hillenbrand R. et al., "Higher-harmonics generation in tapping-mode atomic-force microscopy: Insights into the tipsample interaction", Applied physics Letters, vol. 76, No. 23, Jun. 5, 2000, p. 3478.

Stark, M. et al., "From images to Interactions: High-Resolution Phase Imaging in Tapping-Mode Atomic Force Microscopy"; Biophysical Journal, vol. 80, Jun. 2001, p. 3009-3018.

Tamayo, J. "Relationship between phase shift and energy dissipation in tapping-mode scanning force microscopy", Applied Physics Letters, vol. 73, No. 20, Nov. 16, 1998, p. 2926.

* cited by examiner

METHOD FOR USING AN ATOMIC FORCE MICROSCOPE

Claim of Priority

This application is a U.S. national phase application under 35 U.S.C. §371 of International Patent Application No. PCT/ES2006/070096 filed Jul. 4, 2006, the disclosure of which is hereby incorporated by reference in its entirety. The International Application was published in Spanish on Oct. 1, 2008 as WO/2008/003796.

FIELD OF THE INVENTION

In general, this invention relates to a method of using an atomic force microscope (AFM) by means of amplitude modulation in order to analyse a sample at a nanometric scale, and, in particular, to a method of using said AFM by the simultaneous excitation of several normal vibration modes of the microlever thereof.

PRIOR STATE OF THE ART

In the past few years, atomic force microscopy (AFM), in its dynamic modes, has become one of the most powerful and versatile techniques for the nanometric-scale characterisation of the topography of a large variety of materials, such as biological molecules, polymers, semiconductors, ceramic materials or organic molecules. Due to their very high resolution (lateral and vertical) and robust operation, atomic force microscopes have been incorporated into both research laboratories and innovation and characterisation departments in technological sectors, such as the development of polymers or integrated circuits, to mention two examples. The potential of AFM microscopies in both basic research and technological applications would considerably expand if they could detect very small forces, in the pN range. Thus, the high spatial resolution could be accompanied by a great capacity to measure other surface physical or chemical properties, such as the chemical composition or the mechanical properties.

On the other hand, atomic force microscopy technology has led to a new type of micro- and nanomechanical sensors based on the changes in the dynamic properties (amplitude, phase or frequency) undergone by a microlever when chemical or biological molecules are adsorbed thereon (J. Fritz et al. *Science* 288, 316 (2000)).

The most widely spread AFM mode is known as amplitude modulation mode (AM-AFM; the most widespread commercial name is tapping mode AFM), which consists of the excitation of the microlever at the (fundamental) resonance frequency and the establishment of a feedback system based on the monitoring of the oscillation amplitude.

Since 1993, various schemes have been proposed to combine topography and compositional contrast using the dynamic modes of AFM. The most noteworthy has consisted of measuring the phase displacement between the oscillation signal and the excitation force. The measurement of the phase displacement is performed jointly and simultaneously with the measurement of the amplitude. In this case, the phase has been proposed in order to obtain information about compositional variations (D. Chernoff, *Proc. Microscopy and Microanalysis*, New York 1996; J. Tamayo and R. Garcia, *Appl. Phys. Lett.* 71, 2394 (1997); J. P. Cleveland et al. *Appl. Phys. Lett.* 72, 2613 (1998); G. Bar et al. *Langmuir* 14, 7343 (1998)). These measurements have made it possible to obtain images where the various components of polymer materials, semiconductors or organic compounds are visualised. However, various works have shown that the phase signal pertaining to the oscillation is governed by the inelastic energy dissipated between the tip and the sample. This suggests that different combinations of inelastic processes and elastic properties of the material may cause the same phase displacement; consequently, the phase displacement of the first harmonic does not provide quantitative information about the properties of the material (Tamayo, García *Applied Phys. Letters* 73, 2926 (1998)). On the other hand, it has been shown that the phase signal also includes a topographic component, which makes separation between topographic and compositional information more difficult (M. Stark et al. *Biophys. J.* 80, 3009 (2001)).

Recently, other methods have been proposed to combine topographic information and chemical information, such as patent (P. Hinterdorfer, J. Nelson, U.S. Pat. 60/423,222); however, this type of schemes are only applicable to measure specific interactions between biological molecules, which considerably restricts the scope of application of the method.

Several factors may contribute to explain the current limitations of atomic force microscopy to obtain information beyond topography. Amongst them, it is worth mentioning the consideration of the AFM microlever as a single-mode mechanical system, i.e. the microlever is considered to be a mechanical system characterised by a single resonance frequency (the fundamental one). Consequently, the excitation is performed at frequencies close to the resonance frequency. However, a microlever has several vibration modes, all of them at frequencies higher than the fundamental frequency. For example, for a lever in the shape of a rectangular prism, with a uniform density, the ratio between frequencies is $v_0$, $6.39v_0$, $17.9v_0$. In atomic force microscopy, the contributions of the modes higher than the oscillation amplitude are quite small, but they are, however, noticeable under experimental conditions (R. Hillenbrand et al. *Appl. Phys. Lett.* 76, 3478 (2000); Stark T. R. Rodríguez, R. García, *Appl. Phys. Lett.* 80, 1646 (2002)).

In order to increase the higher mode components, the simultaneous excitation of several oscillation modes of the microlever has been proposed (T. R. Rodríguez, R. García, PCT/ES2006/070016 and *Appl. Phys. Lett.* 449, 84 (2004).

The final result entails having a microscope that has 2n independent interaction channels with the material (two for each vibration mode), each of which could analyse a different property.

Application PCT/ES2006/070016 proposes a method of using an atomic force microscope by means of amplitude modulation, which comprises exciting two natural vibration modes of the microlever, and analysing the variation of the oscillation amplitude of the microlever's response to the excitation in the lower mode, in order to obtain topographic information about the sample, and analysing the phase variation, or phase displacement, of the microlever's (M) response to the excitation in the higher mode, in order to obtain compositional information about the sample.

In this application, said variations are analysed with respect to the total oscillation amplitude of the microlever, both that of the amplitude of the lower mode (as was conventionally done) and that of the phase, or phase displacement, of the higher mode, and it is shown that, for changes in the properties of the sample material, the phase variation, or phase displacement, in the higher mode is significant, contrary to what occurs with the lower mode, which justifies said proposal, in the sense of using the variation of amplitude of the lower mode, or first mode, with respect to the variation of said total amplitude to obtain topographic information about the sample and the variation of the phase of the higher mode, with respect to the total amplitude, to obtain information about the compositional contrast of the sample, or of different samples.

Although said proposal represented a great advance in the field of atomic force microscopy, by assuming the microlever's multi-mode character, and was able to significantly increase the sensitivity of such microscopes to compositional contrast, said proposal still carries one of the limitations of conventional methods; namely, performing the analyses of the variations of the variables with respect to the total oscillation amplitude of the microlever's response, both in regards to the conventional use of the amplitude of the lower mode as the variable to be analysed, and the proposed use, in said application PCT/ES2006/070016, of the phase of the higher mode as the variable to be analysed.

EXPLANATION OF THE INVENTION

These inventors have observed that, starting from the advantages obtained upon assuming the microlever's multi-mode character, as done in application PCT/ES2006/070016, but eliminating the limitations described above, it is possible to increase the sensitivity of an atomic force microscope even further, as well as not limit the use of the amplitude of the lower mode to obtain topographic information, nor that of the phase of the higher mode for the compositional information.

To do so, this invention relates to a method of using an atomic force microscope by means of amplitude modulation, of the type that comprises exciting, normally in a simultaneous manner, at least one natural lower vibration mode and one natural higher vibration mode of a microlever of said microscope, placed on a sample to be examined.

The proposed method comprises:

analysing at least the variation of one variable of a first output signal that is representative of the response of said microlever to said excitation of said lower mode, with respect to the variation of at least one parameter which is influenced by one variable of a second output signal that is representative of the response of said microlever to said excitation of said higher mode, and/or analysing at least the variation of one variable of a second output signal that is representative of the response of said microlever to said excitation of said higher mode, with respect to the variation of at least one parameter which is influenced by one variable of a first output signal that is representative of the response of said microlever to said excitation of said lower mode.

For a preferred embodiment example, said lower mode is the microlever's first natural vibration mode and said higher mode is the microlever's second natural vibration mode.

Although, preferably, said parameter or parameters are equivalent to the variable whereby they are influenced, in another embodiment example, at least one of said parameters is influenced, in a weighted manner, by at least two variables of, respectively, a first and a second output signal that are representative of the response of said microlever to, respectively, said excitation of said lower mode and said higher mode.

In general, said variables that influence said parameters are relative to the oscillation amplitude.

Depending on the embodiment example, said variable of said first output signal and said variable of said second output signal are each relative to the oscillation amplitude, to the phase or to the resonance frequency of their respective output signals.

Specifically, in order to perform said analysis or analyses, the method comprises using, for different embodiment examples:

the phase as the variable of said first output signal, and the amplitude as the variable of said second output signal, or viceversa, the amplitude as the variable of said first output signal, and the resonance frequency as the variable of said second output signal, or viceversa, the phase as the variable of said first output signal, and the resonance frequency as the variable of said second output signal, or viceversa, the amplitude as the variable of both output signals, the phase as the variable of both output signals, the resonance frequency as the variable of both output signals.

For another embodiment example, the method comprises exciting one or more higher modes of the microlever, and taking into account, for said analysis or analyses, one or more variables of an output signal obtained by said excitation of said other higher mode.

The proposed method comprises performing the analyses described to obtain topographic and/or compositional information about said sample, without limiting the use of the variation of the amplitude of the lower mode to obtain topographic information, nor that of the phase of the higher mode to obtain compositional information, as proposed in application PCT/ES2006/070016, but any of the variables described above for the different embodiment examples, i.e. the amplitude, the phase or the frequency of any of the modes, with respect to an equivalent parameter or one that is influenced at least in part by the amplitude, the phase or the frequency of another mode, in any order.

The proposed method also comprises changing said sample to be examined by, at least, a second sample and performing, with said second sample, the same steps that were performed with the sample.

In order to facilitate the interpretation and presentation of the results of the analyses described, the method comprises performing a cross-representation of the data obtained as a result of said analysis or analyses, for two or more variables of, respectively, two or more output signals that are representative of the response of said microlever to corresponding excitations of said natural vibration modes.

For an embodiment example, said representations are visual representations, in the form of a graph or a table, some of which are represented in the attached figures, which will be described in a section below.

The method also comprises recording and classifying the data obtained for a plurality of different samples, as well as comparing the data obtained for an analysis of the sample located under said microlever to said recorded data, and, on the basis of the result of said comparison, establishing a degree of similarity with at least one sample of said plurality of samples.

BRIEF DESCRIPTION OF THE DRAWINGS

The preceding and other advantages and characteristics will be more fully understood from the following detailed description of some embodiment examples that refer to the attached drawings, which are presented for illustrative, non-limiting purposes, and wherein.

070016, but with a number of added blocks, framed within dotted lines, which are used to perform the method proposed by this invention.

Figure 2:
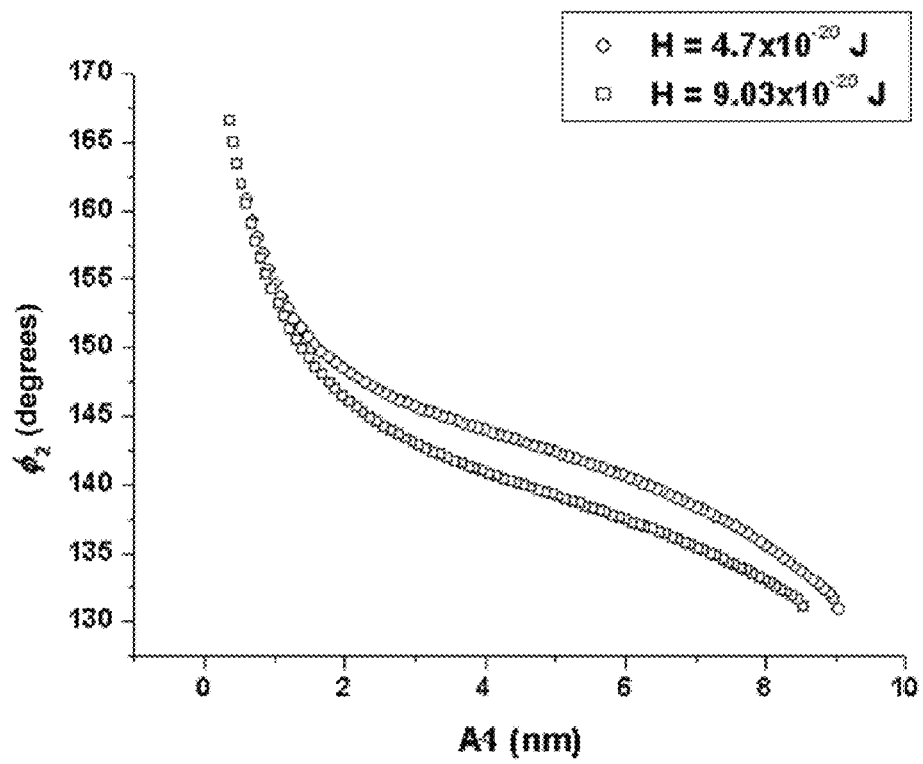

FIG. 2 is a graph that shows, for two different materials, the variation of the phase displacement of the second oscillation mode of the microlever when it is excited in the first two modes (with free oscillation amplitudes of 10 and 1 nm, respectively), with respect to the amplitude of the first mode.

Figure 3:
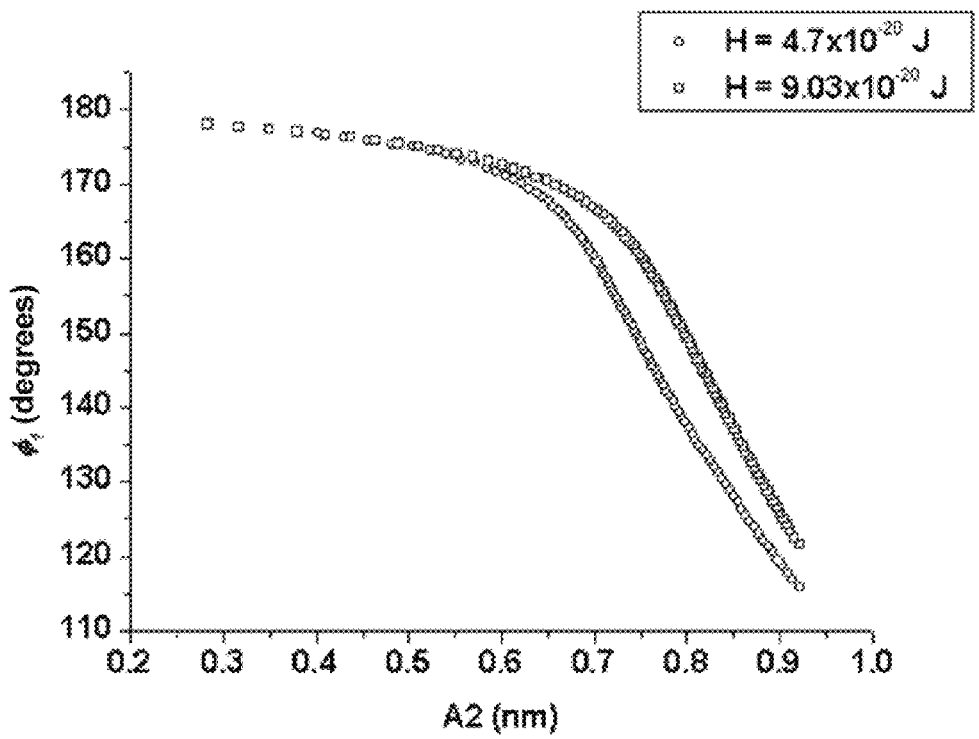

FIG. 3 is a graph that shows, for two different materials, the variation of the phase displacement of the first oscillation mode of the microlever when it is excited in the first two modes (with free oscillation amplitudes of 10 and 1 nm, respectively), with respect to the amplitude of the second mode.

Figure 4:
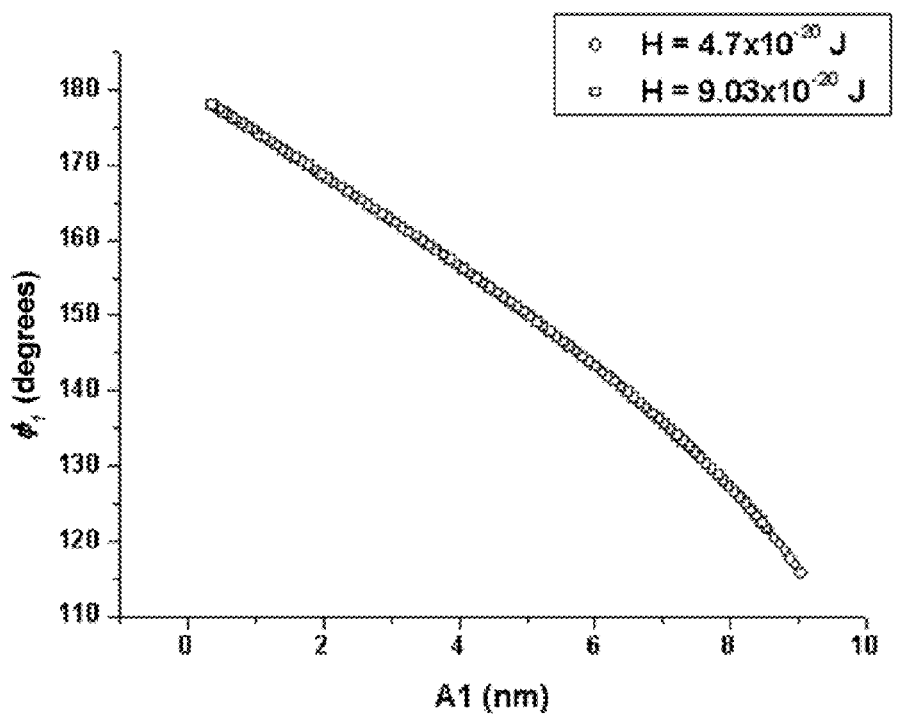

FIG. 4 is a graph that shows, for two different materials, the variation of the phase displacement of the first oscillation mode of the microlever when it is excited in the first two modes (with free oscillation amplitudes of 10 and 1 nm, respectively), with respect to the amplitude of the first mode.

Figure 5:
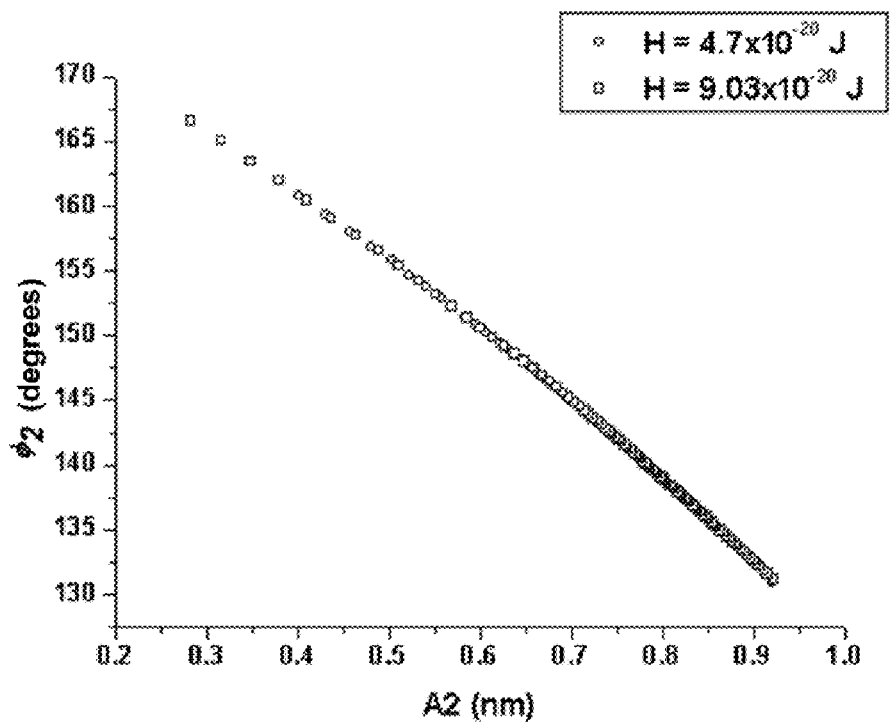
Figure 6:
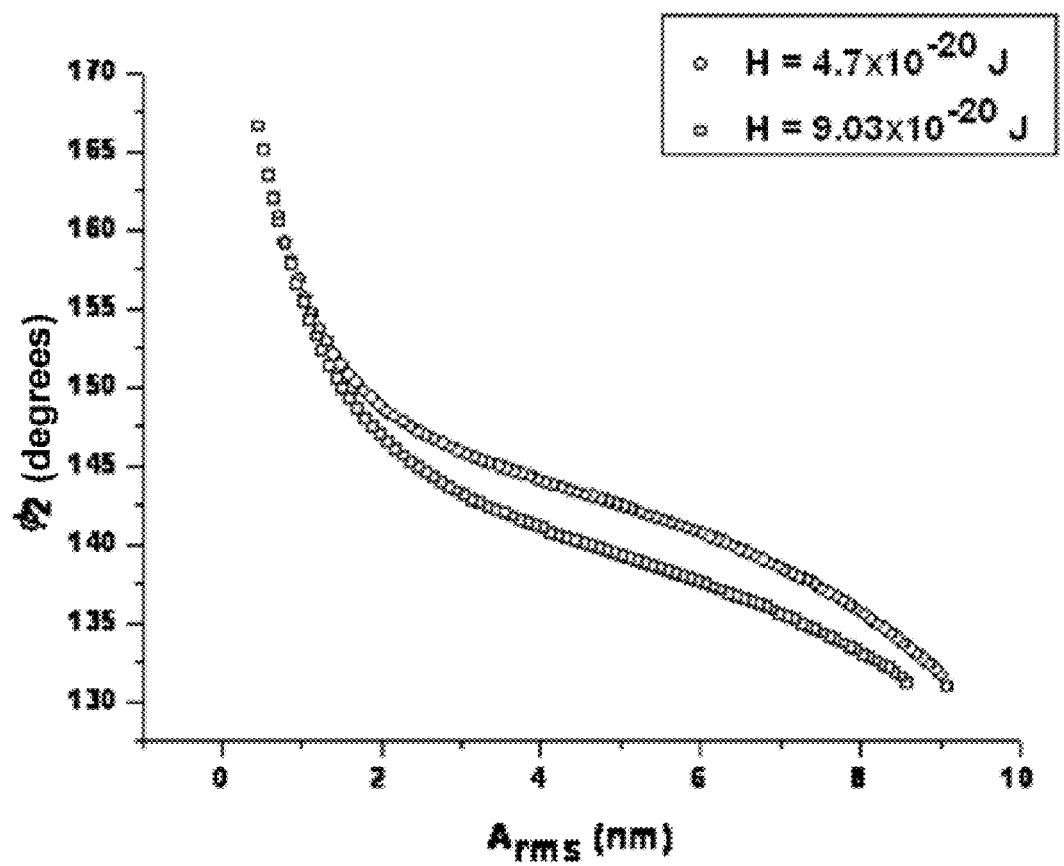

FIG. 5 is a graph that shows, for two different materials, the variation of the phase displacement of the second oscillation mode of the microlever when it is excited in the first two modes (with free oscillation amplitudes of 10 and 1 nm, respectively), with respect to the amplitude of the second mode; and FIG. 6 is a graph that shows, for two different materials, the variation of the phase displacement of the second oscillation mode of the microlever when it is excited in the first two modes (with free oscillation amplitudes of 10 and 1 nm, respectively), with respect to a parameter that is representative of a weighted sum of amplitudes of both modes.

DETAILED DESCRIPTION OF SOME EMBODIMENT EXAMPLES

A number of experimental simulations and trials have been performed in order to demonstrate the value of the proposed method, which, amongst others, have offered a number of data that are represented by the graphs illustrated by FIGS. 2 to 6.

Below we explain a number of concepts and mathematical expressions wherein the above-mentioned simulations have been based, which explain the behaviour of the microscope illustrated by FIG. 1, used in accordance with the proposed method.

As mentioned above, this invention assumes the multi-mode character of microlever M (see FIG. 1), the simultaneous excitation of several modes of microlever M by mechanical, electrostatic or thermal means, or any combination thereof. This invention specifies that what is relevant to obtain an increase in the sensitivity of the micromechanical device (atomic force microscope or mechanical sensor) to physical interactions in the use of analyses and representations that cross parameters from one mode (amplitude, phase or resonance frequency) with parameters from another mode (cross-representations).

The feasibility of the invention is based on the numerical analysis of the dynamic behaviour of an atomic force microscope, a task that has been performed at the Forces and Tunnel laboratory of the Higher Council for Scientific Research (CSIC).

In the first place, microlever M is considered to be a continuous system, $w(x,t)$, that is externally excited and interacts with the sample through a long-range interaction (van der Waals force) and a short-range interaction described by the Derjaguin-Muller-Toporov model. Under these conditions, the equation of movement is:

$$\frac{EI}{L^4}\frac{\partial^4}{\partial x^4}[w(x,t)] + a_1\frac{\partial w(x,t)}{\partial t} + bh\rho\frac{\partial^2}{\partial x^2}w(x,t) = F_{exc} + F_{med} + F_{ts} \quad -1-$$

where E is Young's module, I is the moment of inertia formed by microlever M, and L is the length. $F_{exc}$, $F_{med}$ and $F_{ts}$ are, respectively, the excitation force, the friction force with the medium and the interaction force per unit of length.

On the other hand, the deflection of microlever M is expressed as:

$$w(L,t) = \sum_{n=1}^{\infty}\varphi_n(L)Y_n(t) = \sum_{n=1}^{\infty}y_n(t) = y_1(t) + y_2(t) + y_3(t) + \ldots \quad -2-$$

$$w(L,t)=y_0+A_1\cos(\omega_1 t-\phi_1)+A_2\cos(\omega_2 t-\phi_2)+A_3\cos(\omega_3 t-\phi_3)+ \quad -3-$$

where, $$y_i = A_i\cos(\omega t - \phi_i) \quad -4-$$

The total amplitude (rms value) would be calculated as $$A_{tot} = \left[\frac{2}{T}\int_0^{T_n} dt[w(L,t)]^2\right]^{1/2} \quad -5-$$

The different channels arise naturally when microlever M of an AFM is considered to be a mechanical system that contains many autovibration modes. The excitation of the first mode and the non-linear character of the interaction generate the excitation of higher harmonics of the first mode; however, it has been shown that the amplitude of these components under relevant experimental conditions is approximately four orders of magnitude smaller than the fundamental one, which makes the experimental use thereof very difficult (T. R. Rodríguez, R. García, *Appl. Phys. Lett.* 80, 1646 (2002)). In order to increase the higher mode components, the simultaneous excitation of several oscillation modes of microlever M has been proposed, which may be two, three, four, etc. (R. García and T. R. Rodríguez, PCT/ES2006/070016). The purpose is to establish a relationship between the amplitudes of the lowest frequency mode and the higher mode of approximately 1%-10%. The excitation could also be multi-mode by means of an expression of the type, $$F_{exc}(x,t) = \sum_i^n F_i\cos\omega_i t \quad -7-$$

where $F_i$ and $\omega_i$ represent the excitation force and the mode frequency of microlever M. As a consequence of this previous excitation, 2n communication channels with the sample will be generated. For each mode, two channels are provided, one for amplitude A and the other for phases $\phi$. For reasons of brevity and in order to show the concept of multi-mode operation, we will present the two-mode case of the atomic force microscope, i.e. when two vibration modes are simultaneously excited, which may be the first and the second, the first and the third, and so on, or the second and the third, etc., and all the possible combinations between them. The two-mode excitation is as follows:

$$F_{exc}(x,t)=F_i\cos\omega_i t+F_j\cos\omega_j t \quad -8-$$

where $\omega_i$ and $\omega_j$ are the frequencies of two normal modes of microlever M that fulfil the condition j>i. Thus, the amplitude of the higher modes will no longer be simply controlled by the excitation caused by the harmonics of the fundamental mode, as is the case with a (dynamic) atomic force microscope, but as a result of a force that may be controlled by the observer.

Figure 1:
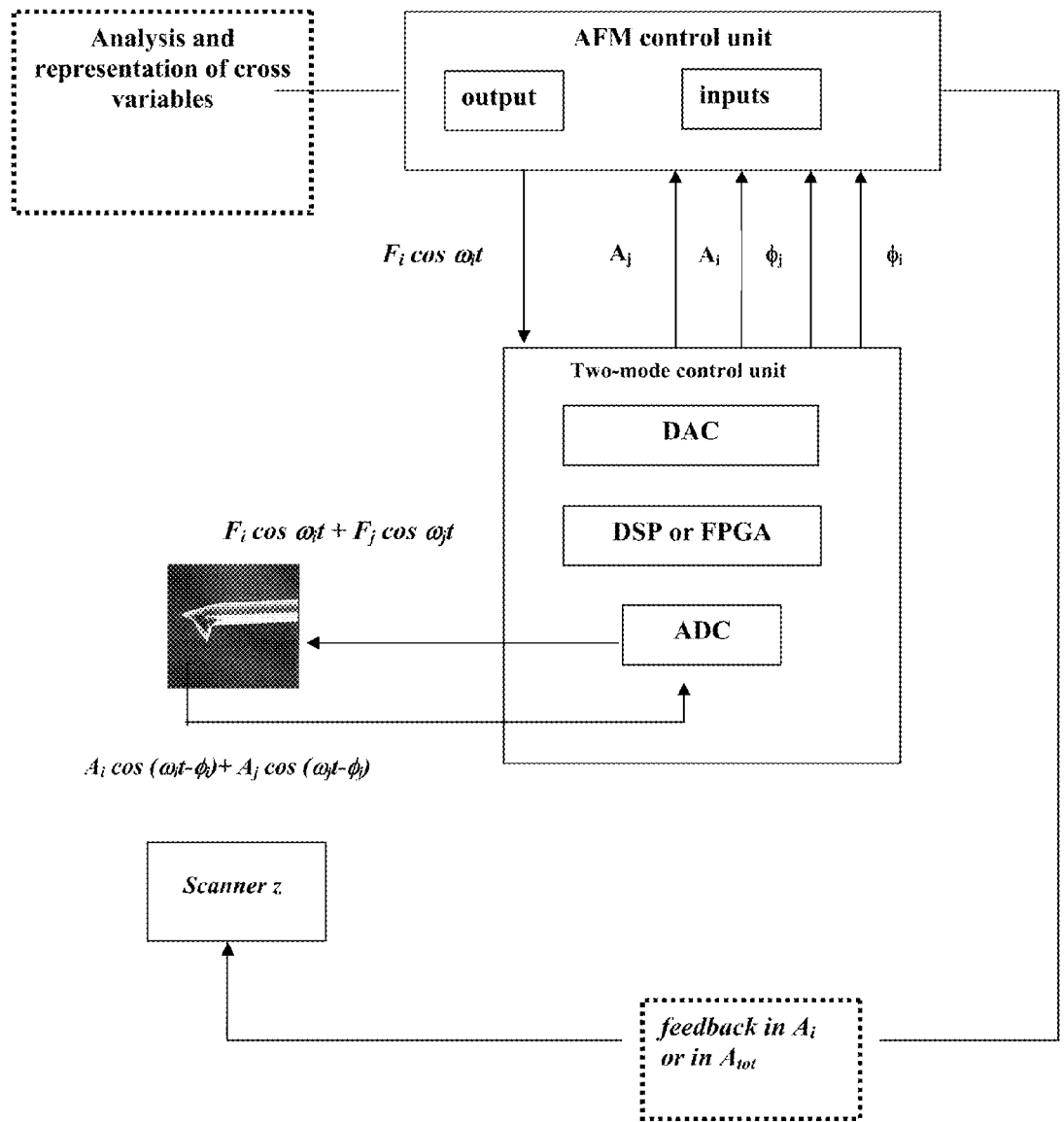
FIG. 1 shows a block-level description of an atomic force microscope as that proposed by application PCT/ES2006/

The microscope illustrated by FIG. 1 is like that proposed in patent application PCT/ES2006/070016, with the corresponding two-mode excitation module, formed by the AFM control unit and the two-mode control unit, already described in said application, as well as a number of added blocks, framed within dotted lines, which are used to perform the method proposed by this invention.

One of said blocks is adapted to perform the analyses described above, at least in part, as well as the cross-representations also described above.

The other module indicated with dotted lines in FIG. 1 is that pertaining to the feedback of scanner z, i.e. the sample support, which generally consists of a piezoelectric tube controlled by a feedback mechanism designed to adjust the distance between the tip of microlever M and the sample, in order to maintain a constant force between them.

Said feedback mechanism conventionally only takes into consideration the amplitude of the first mode, i.e. $A_i$, but the method proposed by this invention comprises performing said feedback on the basis not only of the amplitude of the first mode, $A_i$, but also of the total amplitude, $A_{tot}$.

Said FIG. 1 represents the excitation signal of the lower mode as $F_i \cos \omega_i t$, and that of the higher mode as $F_j \cos \omega_j t$, with j>i.

For a preferred embodiment example, the proposed method comprises performing both excitations by means of a single excitation signal $F_i \cos \omega_i t + F_j \cos \omega_j t$, composed of the sum of said two excitation signals $F_i \cos \omega_i t$ and $F_j \cos \omega_j t$, and, as indicated by an arrow in FIG. 1, applied to microlever M.

For an embodiment example, the method comprises performing the excitation of the two modes externally, and, for another embodiment example, the method comprises performing the excitation of one of said modes externally, and the excitation of the other mode or modes by self-excitation by harmonics or sub-harmonics of the external excitation.

Said external excitation may be any of the following excitations: mechanical, thermal, electrostatic or a combination thereof.

The method also comprises, as shown in FIG. 1, breaking down an output signal $A_i \cos(\omega_i t - \phi_i) + A_j \cos(\omega_j t - \phi_j)$, which is representative of the response of said microlever M to said excitation by said compound excitation signal $F_i \cos \omega_i t + F_j \cos \omega_j t$, separating the parts of the signal that correspond to the response to each of said two excitations, and subsequently using the variables thereof to perform the above-mentioned analyses.

Specifically, the method comprises breaking down (as was done in the proposal of application PCT/ES2006/070016) the information contained in said output signal $A_i \cos(\omega_i t - \phi_i) + A_j \cos(\omega_j t - \phi_j)$ into four channels: two channels with information about oscillation amplitude $A_i$, $A_j$ of said output signal $A_i \cos(\omega_i t - \phi_i) + A_j \cos(\omega_j t - \phi_j)$ for said two excitation frequencies, and two channels with information about phase $\phi_i$, $\phi_j$ of said output signal $A_i \cos(\omega_i t - \phi_i) + A_j \cos(\omega_j t - \phi_j)$ for said two excitation frequencies.

Said four channels are used to perform the analyses and cross-representations in accordance with the method proposed by this invention, some of which are illustrated by FIGS. 2 to 6, for some of the possible embodiment examples presented in a previous section.

The numerical simulations presented below illustrate the advantages offered by the analysis and the cross-representation of variables pertaining to different modes, in the particular case of a two-mode excitation that acts on the first and second modes of an AFM.

FIG. 2 shows how the dependency of the phase of the second mode $\phi_2$ with respect to the amplitude of the first mode $A_1$ makes it possible to distinguish between two different interaction forces; that is, two different materials (it may be observed that, for $A_1$=5 nm, there is a variation of $\Delta\phi_2$=3 degrees, which the model allows to convert into an increase in interaction forces that in this case is equal to $\Delta F$=3.41 pN), the Hamacker constants whereof are H=4.7×10$^{-20}$ J and H=9×10$^{-20}$ J, respectively. This analysis, the result whereof has been graphically represented in said FIG. 2, makes it possible to detect the differences between the materials.

FIG. 3 shows how the dependency of the phase of the first mode $\phi_1$ with respect to the oscillation amplitude of the second mode $A_2$ makes it possible to distinguish between two different interaction forces; that is, two different materials (it may be observed that, for $A_2$=0.8 nm, there is a variation of $\Delta\phi_1$=10 degrees, which the model allows to convert into an increase in interaction forces that in this case is equal to $\Delta F$=21.70 pN), which are represented in FIG. 2. This analysis, the result whereof has been graphically represented in said FIG. 3, also makes it possible to detect the differences between the materials.

FIG. 4 shows that the phase of the first mode $\phi_1$ is not sensitive to the change in material properties (only elastic interactions are considered) when it is represented with respect to its own amplitude $A_1$. This representation does not make it possible to detect the differences between the materials.

FIG. 5 shows that the phase of the second mode $\phi_2$ is not sensitive to the change in material properties (only elastic interactions are considered in the model) when it is represented with respect to its own amplitude $A_2$. This representation does not make it possible to detect the differences between the materials.

The results shown in FIGS. 4 and 5 are in contrast with those obtained in FIGS. 2 and 3.

The results shown in FIGS. 2-5 have been obtained with the following parameters L, b, h, E, R and $\rho$ for 255 nm, 40 nm, 1.8 nm, 170 GPa, 20 nm and 2,320 kg/m2; k1=0.9 N/m, k2=35.22 N/m; Q1=255; Q2=1,002; F1=60 pN and F2=20 pN. The two materials used were simulated using Hamacker constants Ha=4.7×10$^{-20}$ J and Hb=9×10$^{-20}$ J.

The preceding figures have allowed to establish that the most genuine way to obtain compositional contrast by attractive elastic interactions is the analysis and cross-representation of variables of both modes. If the phase of one mode is represented with respect to its own amplitude, no contrast is obtained (in the absence of elastic interactions).

In the embodiment examples illustrated by FIGS. 2 and 3, the abcissa axis represents a pure variable of one mode, specifically, the amplitude ($A_1$ in FIG. 2 and $A_2$ in FIG. 3). These cases are representative of the embodiment examples described for which the parameter, or the parameters, with respect to which the variation analysis of a variable is performed ($\phi_2$ in FIG. 2 and $\phi_1$ in FIG. 3) are equivalent to a single variable, in this case $A_1$ in FIG. 2 and $A_2$ in FIG. 3.

Other embodiment examples are proposed, also already described, for which said parameters are influenced, in a weighted manner, by two variables of, respectively, a first $A_i \cos(\omega_i t - \phi_i)$ and a second $A_j \cos(\omega_j t - \phi_j)$ output signals that are representative of the response of microlever M to, respectively, the excitation of the lower mode and of the higher mode.

FIG. 6 is representative of said embodiment examples for which said parameters are a weighted sum of amplitudes of both modes. The differences between the graphs of both materials (the same as in FIGS. 2 to 5), it is also possible to maintain the sensitivity to the change in interaction forces if the variable of one mode (amplitude or phase) is represented with respect to said parameter that is representative of a weighted sum of amplitudes of both modes, which, for said embodiment example illustrated in FIG. 6, are the total amplitude (rms value), but which for other embodiment examples could be any other type of weighted sum.

The proposed method is equally applicable for those cases wherein microlever M is used as a sensor to determine the adsorption of chemical or biological molecules.

For an embodiment example of the proposed method, either the amplitude of the lower mode $A_i$ or the total amplitude is used to form an image of the system's topography, whereas the cross signals pertaining to different modes $A_j$ and $\phi_j$ are used to complete the topographic characterisation or to provide information about the material's physical and/or chemical properties, in the form $A_j$ vs. $\phi_j$, or $\phi_j$ vs. $\phi_i$, $\phi_i$ vs. $A_j$, with i≠j. The case $\phi_i$ vs. $A_{tot}$, where $\phi_i$ is the phase of a mode other than the fundamental one, could also be considered.

A person skilled in the art could introduce changes and modifications in the embodiment examples described without going beyond the scope of the invention, as defined in the attached claims.

The invention claimed is:

1. A method of using an atomic force microscope by means of amplitude modulation, the method comprising the steps of:
    exciting at least one natural lower vibration mode and one natural higher vibration mode of a microlever of said atomic force microscope,
    analysing at least one of a variation of one variable of a first output signal that is representative of a response of said microlever to said excitation of said lower vibration mode, with respect to a variation of at least one parameter which is influenced by one variable of a second output signal that is representative of a response of said microlever to said excitation of said higher vibration mode, and
    a variation of one variable of the second output signal that is representative of a response of said microlever to said excitation of said higher vibration mode, with respect to a variation of at least one parameter which is influenced by one variable of a first output signal that is representative of a response of said microlever to said excitation of said lower vibration mode.

2. The method of claim 1, wherein at least one of said at least one parameters is equivalent to said one variable by which it is influenced.

3. The method of claim 1, wherein at least one of said at least one parameters is influenced, in a weighted manner, by at least two variables of, respectively, the first and the second output signals that are representative of the response of said microlever to, respectively, said excitation of said lower vibration mode and of said higher vibration mode.

4. The method of claim 1, wherein the variable of said first output signal and said variable of said second output signal are each relative to at least one of an oscillation amplitude, a phase, and a resonance frequency of the respective first and second output signals.

5. The method of claim 4, wherein said influencing variable or variables of at least one of said parameters are relative to the oscillation amplitude.

6. The method of claim 4, wherein the analysis step comprises using:
    a phase as the variable of said first output signal and an amplitude as the variable of said second output signal;
    or
    an amplitude as the variable of said first output signal and an resonance frequency as the variable of said second output signal;
    or
    the phase as the variable of said first output signal and the resonance frequency as the variable of said second output signal;
    or
    the amplitude as the variable of both output signals,
    or
    the phase as the variable of both output signals,
    or
    the resonance frequency as the variable of both output signals.

7. The method of claim 1, wherein said lower vibration mode is a first natural vibration mode of the microlever.

8. The method of claim 1, wherein said higher vibration mode is a second natural vibration mode of the microlever.

9. The method of claim 1, further comprising the step of exciting at least another higher vibration mode of the microlever, and wherein, said analysis steps further include at least one variable of an output signal obtained by said excitation of said other higher vibration mode.

10. The method of claim 1, wherein it comprises performing said excitation of at least said two modes externally.

11. The method of claim 10, wherein said external excitation is at least one excitation from the group that includes mechanical, thermal, electrostatic, and a combination thereof.

12. The method of claim 1, further comprising the steps of performing an excitation of one of said modes externally, and
    performing the excitation of the other mode by one of self-excitation, harmonics, and sub-harmonics of the external excitation.

13. The method of claim 1, further comprising the step of performing said analysis or analyses to obtain at least one of topographic and compositional information about said sample.

14. The method of claim 13, wherein further comprising the steps of changing said sample to be examined by at least one second sample, and
    performing, with said second sample, the same steps that were performed with the first sample.

15. The method of claim 14, wherein further comprising the steps of: recording and classifying the data obtained for a plurality of different samples.

16. The method of claim 15, further comprising the steps of:
    comparing the data obtained for an analysis of the sample located under said microlever to said recorded data, and
    establishing, based on the comparison, a degree of similarity with at least one sample of said plurality of samples.

17. The method of claim 1, wherein further comprising the step of performing at least one cross-representation of the data obtained as a result of said analysis step, for two or more variables of, respectively, two or more output signals that are representative of the response of said microlever to the corresponding excitations of said natural vibration modes.

18. The method of claim 17, wherein said cross-representation is a visual representation, in the form of a graph or a table.

19. The method of claim 1, further comprising the step of performing at least two of said excitations of said natural vibration modes of the microlever simultaneously.

20. The method of claim 19, wherein performing said excitations, using a compound excitation signal composed of the sum of said two excitation signals.

21. The method of claim 20, wherein further comprising the steps of:

breaking down a compound output signal that is representative of the response of said microlever to said excitation using said compound excitation signal;

separating the compound output signal into parts that correspond to the response to each of said excitations, which are at least two, and subsequently using the variables thereof to perform at least the above-mentioned analyses.

* * * * *